US011067395B2

(12) United States Patent
He et al.

(10) Patent No.: US 11,067,395 B2
(45) Date of Patent: Jul. 20, 2021

(54) DIRECTION-FINDING CHIP, DIRECTION-FINDING METHOD AND BEACON

(71) Applicant: REALTEK SEMICONDUCTOR CORPORATION, Hsinchu (TW)

(72) Inventors: Wei-Hung He, Hsinchu (TW); Chun-Ming Cho, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 287 days.

(21) Appl. No.: 16/364,595

(22) Filed: Mar. 26, 2019

(65) Prior Publication Data

US 2019/0346268 A1 Nov. 14, 2019

(30) Foreign Application Priority Data

May 8, 2018 (TW) ................................. 107115572

(51) Int. Cl.
*G01C 21/16* (2006.01)
*G01S 1/28* (2006.01)
(Continued)

(52) U.S. Cl.
CPC ............... *G01C 21/16* (2013.01); *G01S 1/28* (2013.01); *G01S 5/0036* (2013.01); *G01S 5/0284* (2013.01)

(58) Field of Classification Search
CPC ........ G01S 1/28; G01S 5/0036; G01S 5/0284; G01S 19/02; G01S 19/07; H01Q 1/125; H01Q 1/288; H01Q 1/3275
(Continued)

(56) References Cited

U.S. PATENT DOCUMENTS 6,081,230 A * 6/2000 Hoshino ............... G01C 21/165
 342/357.32
10,274,632 B1 * 4/2019 Olsson ..................... H01V 3/16
(Continued)

FOREIGN PATENT DOCUMENTS

CN 102997913 A 3/2013
CN 103502836 A 1/2014

OTHER PUBLICATIONS

OA letter of the counterpart CN application (appl. No. 201810455374.0) dated Dec. 29, 2020. Summary of the OA letter: claims 1-6 are rejected under Patent Law Article 22(3) as being unpatentable over reference 1 (CN103502836A) and reference 2 (CN102997913A).
(Continued)

*Primary Examiner* — Harry K Liu
(74) *Attorney, Agent, or Firm* — WPAT, PC

(57) ABSTRACT

The present invention discloses a direction-finding chip, a direction-finding method and a beacon. The direction-finding chip is applied to a beacon of a direction-finding system. The beacon includes multiple antennas and an inertial measurement unit (IMU). A mobile device can calculate angle information according to supplement provided by the beacon. The direction-finding chip includes a computation circuit and a radio frequency circuit. The computation circuit generates coordinate conversion information or a correction amount of the coordinate conversion information according to an acceleration and a magnetic field vector generated by the IMU. The coordinate conversion information or the correction amount can be used to compensate the angle information. The radio frequency circuit is coupled to the computation circuit and configured to transmit the supplement and the coordinate conversion information or the correction amount.

6 Claims, 5 Drawing Sheets

(51) Int. Cl.
*G01S 5/02* (2010.01)
*G01S 5/00* (2006.01)

(58) Field of Classification Search
USPC .......................................................... 342/358
See application file for complete search history.

(56) References Cited

U.S. PATENT DOCUMENTS

2015/0088419 A1* 3/2015 Bhardwaj ............... G01C 21/20
701/472
2017/0229787 A1* 8/2017 Fenn ....................... H01Q 21/24
2018/0192298 A1* 7/2018 Noerpel ............. H04B 7/18519

OTHER PUBLICATIONS

Tarek Hamel et al., "Attitude estimation on SO(3) based on direct inertial measurements", 2006, IEEE.

Kyle M. Smalling et al., "A Short Tutorial on Inertial Navigation System and Global Positioning System Integration", Sep. 2015, NASA.

Erica Gunhardson, "Indoor Positioning Using Angle of Departure Information", Oct. 1, 2015, Department of Science and Technology Linköping University.

* cited by examiner

DIRECTION-FINDING CHIP, DIRECTION-FINDING METHOD AND BEACON

BACKGROUND OF THE INVENTION

1. Field of the Invention

The present invention generally relates to direction finding or direction-finding systems.

2. Description of Related Art

The disclosure of this invention is related to the following references 1 to 3.
1. Erica Gunhardson, "Indoor Positioning Using Angle of Departure Information," *MS thesis Department of Science and Technology, Linkoping University,* 2015.
2. Tarek Hamel, and Robert Mahony, "Attitude estimation on SO(3) based on direct inertial measurements," *Proc. Int. Conf. Robotics Automation (ICRA),* pp. 2170-2175, 2006.
3. Smalling K M, Eure K W (2015), "A short tutorial on inertial navigation system and global positioning system integration," *Tech. rep., NASA,* NASA/TM-2015-218803, NASA, 2015.

Bluetooth low energy (BLE) technology is widely used in direction finding or navigation. FIG. 1 is a schematic diagram of a conventional direction-finding system. The beacons 110 are deployed at fixed locations in the indoor space. The user's mobile device 120 obtains the beacon data (e.g., the Universally Unique Identifier (UUID) of the beacon, the primary/secondary number of the beacon, etc.) from the beacon 110, and then transmits the beacon data to the server 130. In some scenarios, the server 130 transmits the coordinates of the beacons 110 to the mobile device 120, which in turn utilizes the coordinates of the beacons 110 and other information such as the received signal strength indication (RSSI) to calculate its own coordinates based on triangulation or fingerprinting. In other scenarios, the server 130 calculates the coordinates of the mobile device 120 based on the data transmitted by the mobile device 120 and then transmits the coordinates back to the mobile device 120.

FIG. 2 is another schematic diagram of a conventional direction-finding system. In this scenario, the beacons 110 record their respective coordinates and transmit their respective coordinates as part of the beacon data to the mobile device 120. That is, in this scenario, the mobile device 120 does not need to obtain the coordinates of the beacons 110 from the server.

The mobile device 120 may further improve the positioning accuracy based on angle information (e.g., angle of arrival (AoA) and/or angle of departure (AoD)). To achieve this goal, the beacon 110 must correspondingly provide supplement about the beacon antenna (e.g., supplement may include in-phase/quadrature samples (I/Q samples) which are sent by different antennas in different time slots), so that the mobile device 120 can calculate the angle information based on the phase information of the received I/Q samples in different time slots (reference can be made to chapter 3 of reference 1). In order to effectively utilize the above angle information, the mobile device 120 must also know the directions of the beacon 110 itself and antennas of the beacon 110 relative to the coordinate system of the direction-finding system (e.g., the East-North-Up (ENU) coordinate system). For example, the mobile device 120 may have to know the angles of the antennas with respect to each coordinate axis of the coordinate system. It is a common practice to measure the original angles of the antennas of each beacon 110 one by one when deploying the beacons 110. However, once the beacon 110 is moved or rotated, the original angles are no longer applicable and must be measured again. There is thus a need to save time and labor when deploying the beacons 110 and to save maintenance costs after deployment.

SUMMARY OF THE INVENTION

In view of the issues of the prior art, an object of the present invention is to provide a direction-finding chip, a direction-finding method, and a beacon to save time and labor for deploying beacons and to reduce maintenance costs after the beacons are deployed.

A direction-finding chip applied to a beacon of a direction-finding system is provided. The beacon includes a plurality of antennas and an inertial measurement unit. A mobile device is able to calculate angle information according to a supplement provided by the beacon. The direction-finding chip includes a computation circuit and a radio frequency (RF) circuit. The computation circuit is configured to generate coordinate conversion information or a correction amount of the coordinate conversion information according to an acceleration and a magnetic field vector generated by the inertial measurement unit. The coordinate conversion information or the correction amount can be used to compensate the angle information. The RF circuit is coupled to the computation circuit and is configured to transmit the supplement and the coordinate conversion information or the correction amount.

A direction-finding method applied to a beacon of a direction-finding system is also provided. The beacon includes a plurality of antennas and an inertial measurement unit. A mobile device is able to calculate angle information according to a supplement provided by the beacon. The direction-finding method includes: generating coordinate conversion information or a correction amount of the coordinate conversion information according to an acceleration and a magnetic field vector generated by the inertial measurement unit; and transmitting the supplement and the coordinate conversion information or the correction amount. The coordinate conversion information or the correction amount can be used to compensate the angle information.

A beacon of a direction-finding system is also provided. A mobile device is able to calculate angle information according to a supplement provided by the beacon. The beacon includes a plurality of antennas, an inertial measurement unit, and a direction-finding chip. The inertial measurement unit is configured to generate an acceleration and a magnetic field vector. The direction-finding chip is coupled to the antennas and the inertial measurement unit and is configured to generate coordinate conversion information or a correction amount of the coordinate conversion information according to the acceleration and the magnetic field vector and to transmit the supplement and the coordinate conversion information or the correction amount.

The direction-finding chip, the direction-finding method and the beacon of the invention facilitate the setting of the direction-finding system in a way that the antenna directions of the beacons do not need to be accurately aligned with the coordinate system of the direction-finding system. More specifically, the present invention utilizes an inertial measurement unit (IMU) to automatically conduct measurement and provide accordingly associated information such as acceleration, magnetic field vector and/or angular velocity and uses such information to calibrate the antenna directions of the beacons to save time and manpower for deploying beacons. Furthermore, the present invention can also use the IMU to automatically monitor whether the beacon is rotated or moved, rendering subsequent beacon maintenance more timely and cost-effective.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a direction-finding chip, direction-finding method and beacon. On account of that some or all elements of the direction-finding chip and the beacon could be known, the detail of such elements is omitted provided that such detail has little to do with the features of this disclosure and this omission nowhere dissatisfies the specification and enablement requirements. Some or all of the processes of the direction-finding method may be implemented by software and/or firmware and can be performed by the direction-finding chip or its equivalent. A person having ordinary skill in the art can choose components or steps equivalent to those described in this specification to carry out the present invention, which means that the scope of this invention is not limited to the embodiments in the specification.

Figure 1:
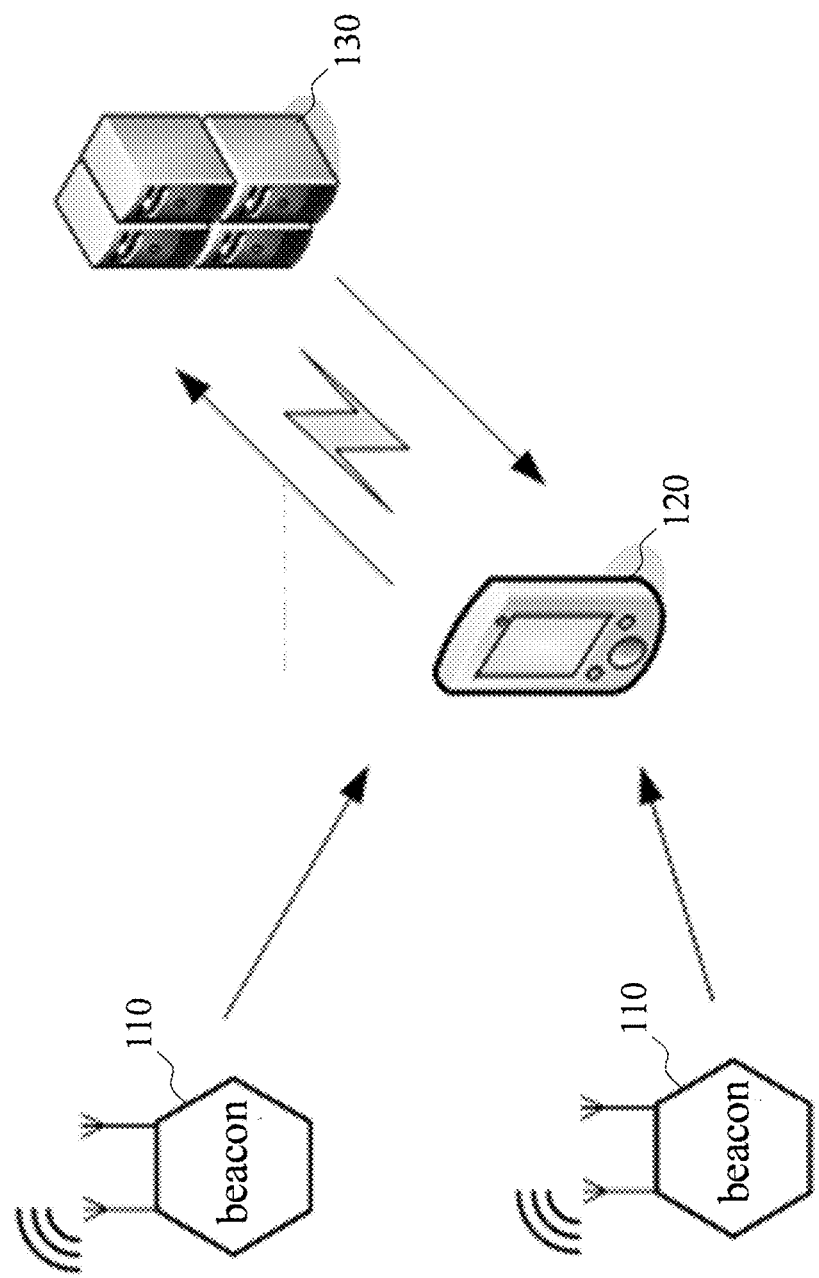
FIG. 1 illustrates a schematic diagram of a conventional direction-finding system.
Figure 2:
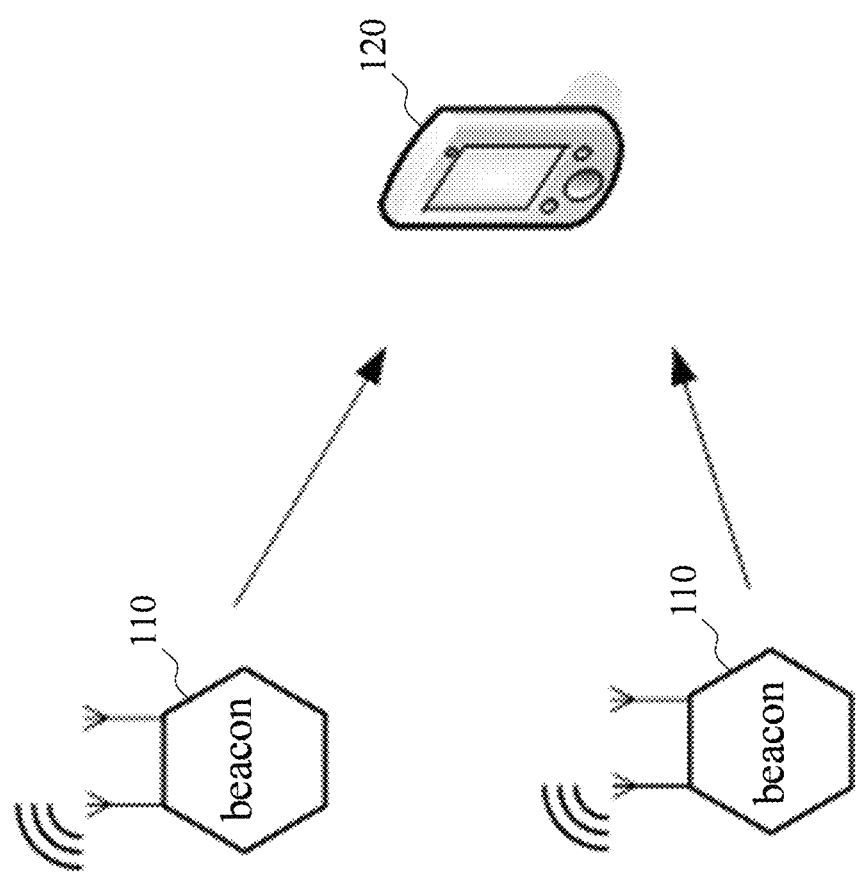
FIG. 2 illustrates another schematic diagram of a conventional direction-finding system.
Figure 3:
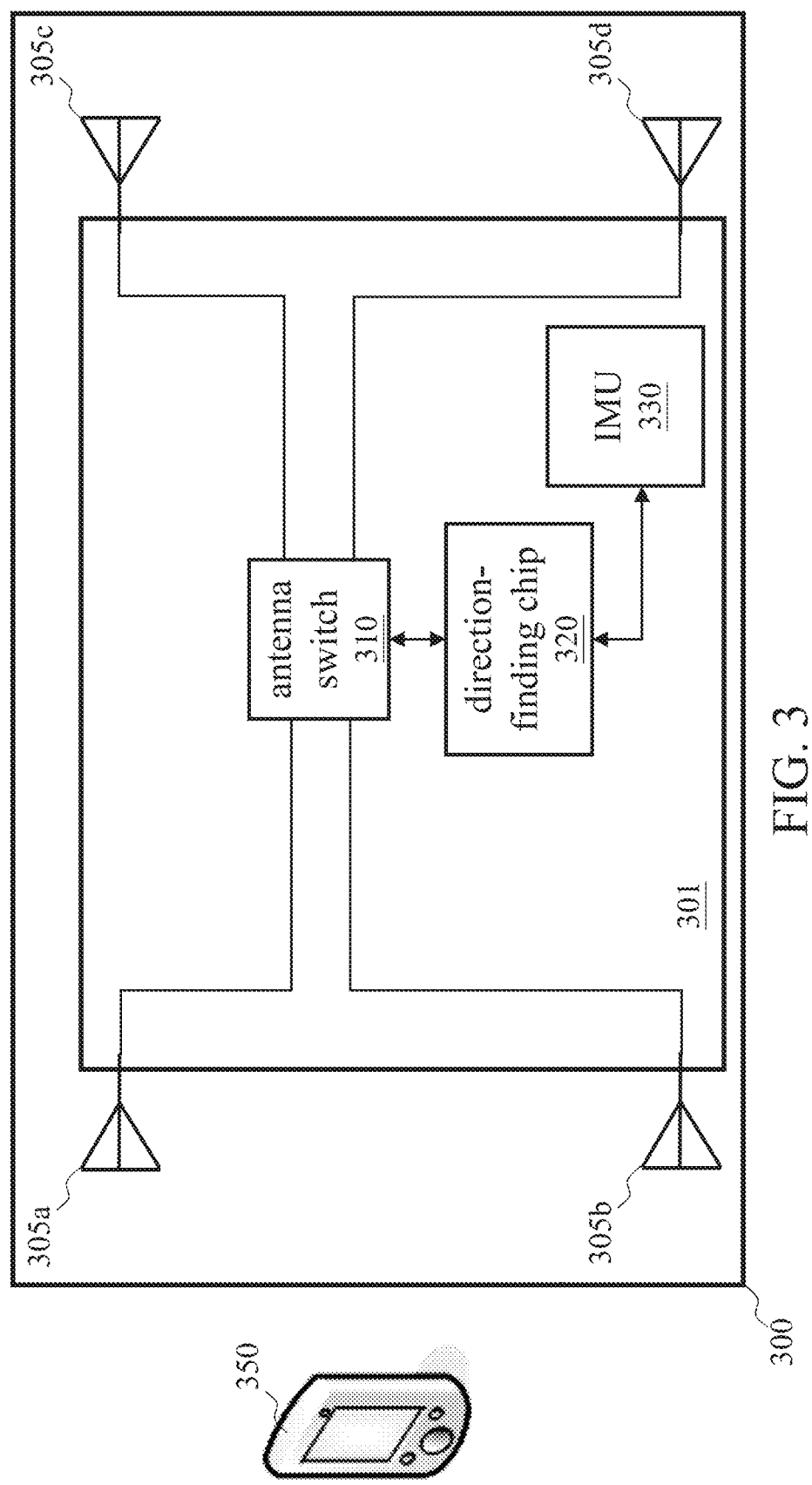
FIG. 3 illustrates a schematic diagram of a beacon according to one embodiment of the present invention.

FIG. 3 is a schematic diagram of a beacon according to one embodiment of the present invention. The beacon 300 includes a circuit board 301, an antenna array 305 (including antennas 305a to 305d), an antenna switch 310, a direction-finding chip 320, and an inertial measurement unit (IMU) 330. The antenna array 305, the antenna switch 310, the direction-finding chip 320, and the IMU 330 are arranged on the circuit board 301. The antenna switch 310 controls the switching of the antennas 305a to 305d (i.e., controlling one or more antennas to transmit/receive the signals). The direction-finding chip 320 is an integrated circuit (IC) that has computational and/or program execution capabilities and can process data based on the Ethernet and/or Bluetooth protocols/specifications. The IMU 330 may include an accelerometer and a magnetometer. Because the antenna array 305 and the IMU 330 are both fixed on the circuit board 301, the relative position and relative angle between the antenna array 305 and the IMU 330 remain substantially unchanged. The IMU 330 can provide the direction-finding chip 320 with information such as the acceleration and magnetic field vector of the beacon 300. Since the antenna switch 310 and the IMU 330 are well-known components, their functions and principles are well known to those skilled in the art and are thus omitted for brevity.

Figure 4:
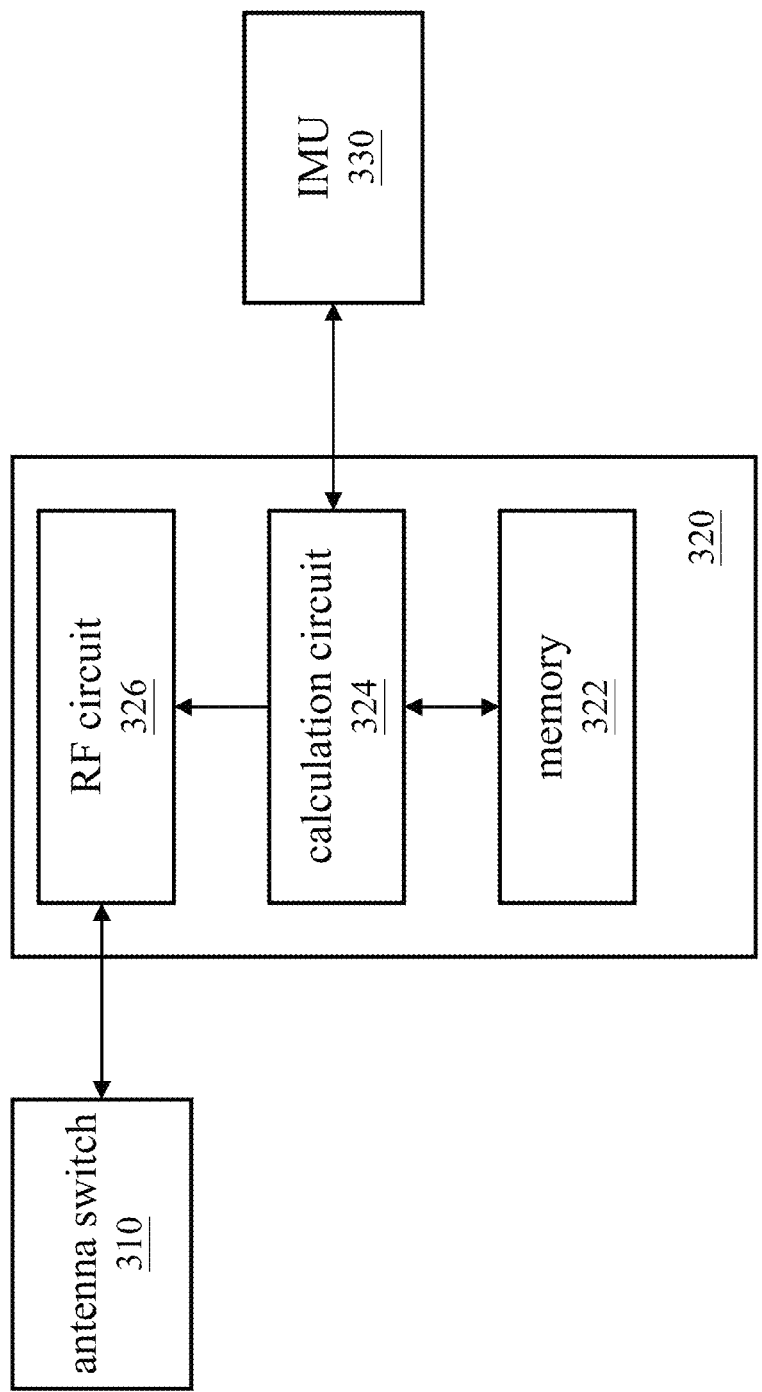
FIG. 4 illustrates a functional block diagram of a direction-finding chip according to one embodiment of the present invention.
Figure 5:
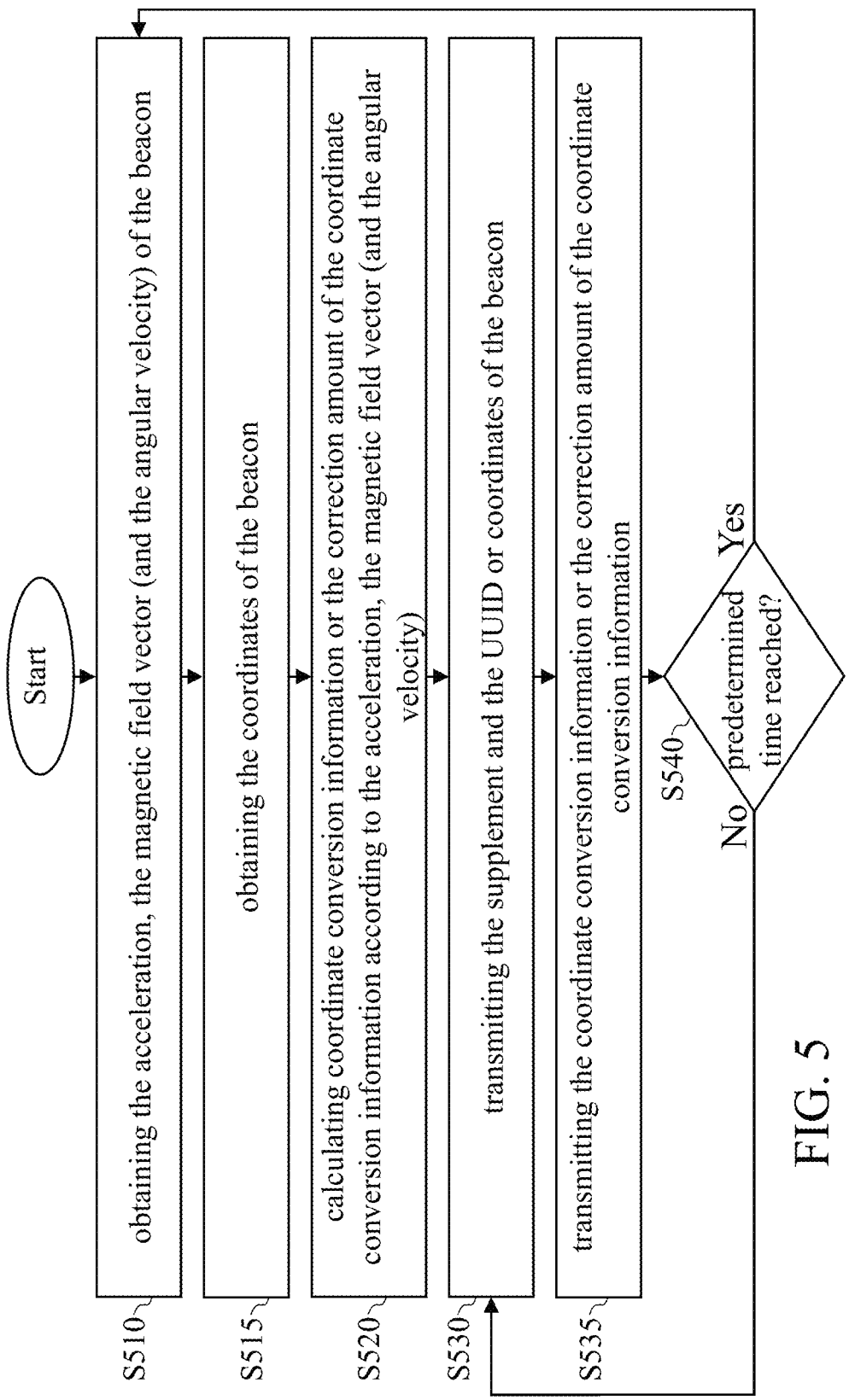
FIG. 5 illustrates a flow chart of a direction-finding method according to an embodiment of the present invention.

FIG. 4 is a functional block diagram of a direction-finding chip according to one embodiment of the present invention. FIG. 5 is a flow chart of a direction-finding method according to an embodiment of the present invention. The direction-finding chip 320 includes a memory 322, a computation circuit 324, and a radio frequency (RF) circuit 326. The computation circuit 324 is coupled to the IMU 330, and the RF circuit 326 is coupled to the antenna switch 310. The memory 322 stores a plurality of codes or program instructions. The computation circuit 324 is a circuit having program execution capability (e.g., a microprocessor, a microcontroller, etc.) and realizes the functions of the direction-finding chip 320 by executing the codes or program instructions. The RF circuit 326 can transmit signals based on, for example, the Ethernet or Bluetooth protocols/specifications.

After the beacon 300 is deployed, the computation circuit 324 obtains information such as the magnetic field vector and the acceleration of the beacon 300 from the IMU 330 (step S510), obtains the coordinates of the beacon from the memory 322 (step S515) (e.g., the coordinates of the beacon are set and stored in advance in the memory 322), and then calculates coordinate conversion information or the correction amount of the coordinate conversion information between the first coordinate system and the second coordinate system based on the magnetic field vector and the acceleration of the beacon 300 (step S520). More specifically, the first coordinate system is the body frame of the beacon 300, and the second coordinate system is the coordinate system of the direction-finding system in which the beacon 300 is located (or referred to as the navigation frame) (e.g., the aforementioned ENU coordinate system), and the coordinate conversion information is the conversion matrix (R) between the first coordinate system ($P_{XYZ}$) and the second coordinate system ($P_{ENU}$). The computation circuit 324 can obtain the coordinate conversion information using a direction conversion and tracking algorithm. The relationship among the first coordinate system $P_{XYZ}$, the second coordinate system $P_{ENU}$, and the conversion matrix R is shown in equation (1).

$$P_{ENU} = R \cdot P_{XYZ} \tag{1}$$

The coordinate conversion information can be calculated by referring to Chapter 3 of reference 1, Euler angles (en.wikipedia.org/wiki/Euler_angles), quaternions and spatial rotation (en.wikipedia.org/wiki/Quaternions_and_spatial_rotation) and conversion between the quaternions and the Euler angles (en.wikipedia.org/wiki/Conversion_between_quaternions_and_Euler_angles). When the first coordinate system and the second coordinate system are aligned, that is, when the angles between the three coordinate axes of the first coordinate system and the three corresponding coordinate axes of the second coordinate system are zero degrees, the conversion matrix is an identity matrix. The foregoing direction conversion and tracking algorithm can be referred to references 2 and 3.

The coordinate conversion information between the first coordinate system and the second coordinate system may also be regarded as an included angle between the first coordinate system and the second coordinate system, and the included angle is a part of antenna direction information of the beacon 300. The antenna direction information also includes the coordinates of the antenna array.

The computation circuit 324 can also calculate the correction amount of the coordinate conversion information based on the acceleration and the magnetic field vector (step S520). More specifically, after the beacon 300 is moved or rotated, the computation circuit 324 provides new coordinate conversion information. The new coordinate conversion information can be an updated Euler angle or updated unit quaternion, or the original unit quaternions plus additional unit quaternions. These additional unit quaternions are the correction amount in step S520.

The computation circuit 324 then transmits the supplement (e.g., the I/Q samples) and the universally unique identifier (UUID) and/or coordinates of the beacon to the mobile device 350 via the RF circuit 326 (step S530). When the RF circuit 326 transmits a signal based on the Bluetooth protocol/specifications, the RF circuit 326 transmits the foregoing data to the mobile device 350 in a way of advertising or connection. When the RF circuit 326 transmits the signal based on the Ethernet protocol/specifications, the computation circuit 324 can transmit the UUID and coordinates of the beacon to the server for the mobile device 350 to query. The computation circuit 324 then transmits the coordinate conversion information or the correction amount of the coordinate conversion information through the RF circuit 326 (step S535).

The mobile device 350 can obtain the coordinates of the mobile device 350 itself in the second coordinate system according to the coordinates of the beacon 300 (obtained directly from the beacon 300 or obtained by querying the server with the UUID), the supplement, the coordinate conversion information (or the correction amount of the coordinate conversion information). For example, the mobile device 350 can obtain the angle information of the antenna array 305 according to the supplement, and can use the coordinate conversion information to compensate the angle information based on equation (1), and then perform positioning (e.g., using triangulation) according to the compensated angle information and the beacon coordinates.

The product of the correction amount of the coordinate conversion information and the old or previous coordinate conversion information is the current coordinate conversion information. In other words, in some cases where the mobile device 350 has the previous coordinate conversion information, the mobile device 350 can compensate the angle information of the antenna array 305 using the previous coordinate conversion information and the correction amount of the current coordinate conversion information. When the direction-finding chip 320 calculates and transmits only the correction amount of the coordinate conversion information, it helps to reduce the power consumption of the beacon 300.

Next, the computation circuit 324 may regularly transmits the supplement, the UUID or coordinates of the beacon, and the coordinate conversion information or the correction amount of the coordinate conversion information (i.e., performing steps S530, S535, and S540) until the predetermined time is reached or expires (step S540 being positive). After step S510 is completed and before the predetermined time is reached or expires, the computation circuit 324 can control the IMU 330 to stop operating (i.e., disabling the IMU 330) to reduce the power consumption of the beacon 300, and after the predetermined time is reached or expires, the computation circuit 324 activates or enables the IMU 330 and performs steps S510 to S540 again. The predetermined time can be, for example, hours, days, or weeks.

In some embodiments, the IMU 330 further includes a gyroscope, and the computation circuit 324 can further obtain more accurate coordinate conversion information or correction amount of the coordinate conversion information according to the angular velocity information provided by the gyroscope. In other words, in step S510, the computation circuit 324 further obtains the angular velocity information provided by the gyroscope, and further, in step S520, calculates the coordinate conversion information or the correction amount of the coordinate conversion information by referring to the angular velocity information.

With the aid of the IMU, the present invention can make the beacon deployment more efficient and can also automatically monitor whether the angles of the beacon and its antennas change after the deployment is completed. The direction-finding chip, direction-finding method and beacon of the present invention can be applied to Bluetooth low energy indoor positioning.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A direction-finding chip implemented in a beacon of a direction-finding system, the beacon comprising a plurality of antennas and an inertial measurement unit, and the beacon providing a supplement according to which a mobile device calculates angle information, the direction-finding chip comprising:
   a computation circuit configured to generate coordinate conversion information or a correction amount of the coordinate conversion information according to an acceleration and a magnetic field vector generated by the inertial measurement unit, wherein the coordinate conversion information or the correction amount is associated with compensation of the angle information; and
   a radio frequency (RF) circuit coupled to the computation circuit and configured to transmit the supplement and the coordinate conversion information or the correction amount.

2. The direction-finding chip of claim 1, wherein the computation circuit enables or disables the inertial measurement unit according to a predetermined time.

3. A direction-finding method performed by a beacon of a direction-finding system, the beacon comprising a plurality of antennas and an inertial measurement unit, and the beacon providing a supplement according to which a mobile device calculates angle information, the direction-finding method comprising:

generating coordinate conversion information or a correction amount of the coordinate conversion information according to an acceleration and a magnetic field vector generated by the inertial measurement unit, wherein the coordinate conversion information or the correction amount is associated with compensation of the angle information; and transmitting the supplement and the coordinate conversion information or the correction amount.

4. The direction-finding method of claim 3 further comprising:

enabling or disabling the inertial measurement unit according to a predetermined time.

5. A beacon of a direction-finding system, a mobile device for calculating angle information according to a supplement provided by the beacon, the beacon comprising:

a plurality of antennas;

an inertial measurement unit configured to generate an acceleration and a magnetic field vector; and a direction-finding chip coupled to the antennas and the inertial measurement unit and configured to generate coordinate conversion information or a correction amount of the coordinate conversion information according to the acceleration and the magnetic field vector and to transmit the supplement and the coordinate conversion information or the correction amount.

6. The beacon of claim 5, wherein relative positions and relative angles between the antennas and the inertial measurement unit remain substantially unchanged.

* * * * *